United States Patent [19]
Arlt et al.

[11] 3,753,281
[45] Aug. 21, 1973

[54] MEANS AND METHOD FOR ALIGNING MOTOR ASSEMBLY

[75] Inventors: Robert G. Arlt; Timothy W. Hennessey, both of Springfield, Ohio

[73] Assignee: Robbins & Myers, Inc., Springfield, Ohio

[22] Filed: Oct. 23, 1970

[21] Appl. No.: 83,430

[52] U.S. Cl. ............................................. 29/205 R
[51] Int. Cl. ............................................. H02k 15/02
[58] Field of Search .................... 29/205 R, 203 J, 29/203 P; 269/49, 40, 43, 321 WE

[56] References Cited
UNITED STATES PATENTS

| 660,486 | 10/1900 | Brown | 269/49 X |
|---|---|---|---|
| 1,066,357 | 7/1913 | Yardley | 269/49 X |
| 1,661,363 | 3/1928 | Elsey | 29/205 R |
| 2,304,607 | 12/1942 | Sleeter | 29/205 R |
| 2,814,096 | 11/1957 | Herbrecht | 29/205 R |
| 2,988,291 | 6/1961 | Greene | 29/205 R |
| 3,182,385 | 5/1965 | Esposito | 29/205 R |
| 3,320,660 | 5/1967 | Otto | 29/205 R |
| 3,320,662 | 5/1967 | Partlow | 29/205 R |
| 3,513,527 | 5/1970 | Hoy | 29/205 R |
| 3,559,266 | 2/1971 | Miles | 29/205 R |

*Primary Examiner*—Granville Y. Custer, Jr.
*Attorney*—Melville, Strasser, Foster & Hoffman

[57] ABSTRACT

Means for aligning the rotating shaft with the outside diameter of the stator of an electric motor subassembly comprising positioning the stator in a unique fixture, applying an adhesive to the mating surface of the stator, placing the head assembly which has been provided with an opening for receiving said shaft onto said stator in aligned relation thereto until said adhesive sets or cures.

5 Claims, 7 Drawing Figures

Patented Aug. 21, 1973

INVENTOR/S

ROBERT G. ARLT &
TIMOTHY W. HENNESSEY
BY *Melville, Strasser, Foster and Hoffman*
ATTORNEYS Patented Aug. 21, 1973

INVENTOR/S
ROBERT G. ARLT &
TIMOTHY W. HENNESSEY

BY *Melville, Strasser, Foster and Hoffman*
ATTORNEYS

MEANS AND METHOD FOR ALIGNING MOTOR ASSEMBLY

BACKGROUND OF THE INVENTION

In a typical electric motor assembly for driving powered machines and appliances, power is transmitted by means of an armature-shaft assembly rotatably mounted within and energized by the stator. Specifically, the armature rotates within a central bore of the stator while being suspended therein by means of bearings at opposite ends of the shaft.

However, problems have developed during the assembly of the motor components, particularly where the intended use for the motor is to drive an electric appliance. That is, a partial motor assembly, comprising an armature, a stator, and one head, may be mounted or set in a "saddle" in the appliance housing where the free end of the motor shaft, the one opposite the commutator, engages in and is supported by a clutch/coupling on the driven shaft. This shaft in turn is supported by bearings in the appliance frame. In such an assembly, it is essential that said motor shaft be concentric with the saddle engaging portion of the motor assembly, the latter portion being the stator O.D.

Heretofore, costly procedures have been necessary to meet the concentricity requirement within the desired tolerance. For example, the earlier procedures for assembling the motor required close dimensional control, both machining and molding, on all parts that affected the electrical alignment of the motor parts. Specifically, the outer diameter of the stator had to be ground from a mandrel to establish concentricity with the stator bore. Additionally, one end of the stator had to be machined so as to establish surfaces that were perpendicular to the stator bore, these surfaces also having to be co-planar. If this were not enough, extremely close molding tolerances were instituted for the head or bearing bracket used at the end of the stator.

The further controls on this procedure called for the use of a mandrel that closely fitted the stator bore and which contained a centralized pin that fitted into the bearing bore and used to centralize the plastic head assembly with respect to the stator bore. Finally, the fastening of the head assembly into aligned relation with the outer diameter of the stator required the use of two screw fasteners. While such a procedure met with varying degrees of success, from a production standpoint, it was costly.

Contrary to the elaborate procedure above, the present invention provides for means whereby the center line of the motor shaft is made coincident to the theoretical center line of the stator circumference, which as stated above is the mounting surface for the motor.

SUMMARY OF THE INVENTION

Briefly, in the practice of this invention, the stator for an electric motor, which is composed of a plurality of stacked laminations, is clamped in a unique fixture. The fixture holds the stator in a concentric position about a centralized pin or mandrel. A suitable adhesive, such as an epoxy, is then applied to the mating surface of the stator which is to receive the end or head assembly. The latter component, which includes the brush holders, bearing support and a terminal block for connection to a power supply, and which has been provided with a central opening for receiving the shaft of the electric motor, is aligned with respect to the pin and placed in position against the said mating surface where the adhesive is permitted to set or cure, thereby aligning the head assembly with the stator assembly.

DETAILED DESCRIPTION OF PREFERRED EMBODIMENT

Figure 2:
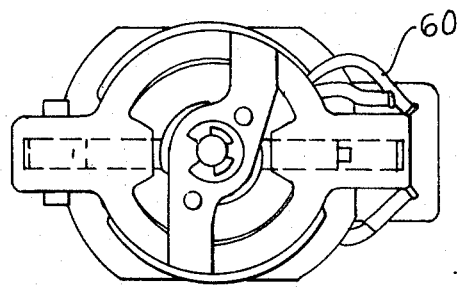
FIG. 2 is an end view of the electric motor subassembly shown in FIG. 1.
Figure 1:
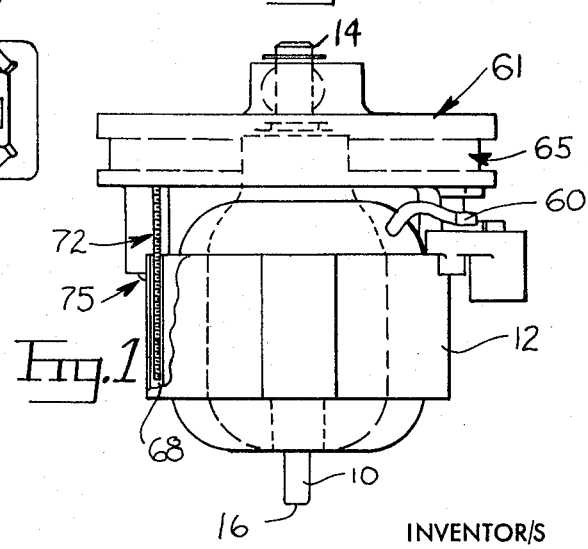
FIG. 1 is a plan view of a typical electric motor subassembly which can be effectively aligned by the system taught herein.

Turning now to a more complete description of this invention, it will be recalled that a typical electric motor assembly comprises among other components a rotating armature with shaft 10 mounted within a stator, plus associated hardware. Power is transmitted to the electrical windings of the armature by means of the commutator situated at one end of the shaft, whereas the power or drive from the motor is imparted by the opposite end of the shaft. Normally such a motor is provided with bearings located in the end caps or heads, for receiving the respective ends of the shaft. However, it will be noted that the structure shown in FIGS. 1 and 2 has only one end assembly, hence a single bearing, at the commutator end 14 of the shaft. This is done so that the free end 16 of the motor shaft, when placed in an appliance, will be engaged in and supported by a clutch/coupling on the driven shaft. This in turn is supported by bearings in the appliance frame.

It should be apparent from the above that with the elimination of one end bearing, the problems of concentricity or aligned relationship of the respective parts become pronounced. However, such problems were greatly minimized by the procedures and means taught herein, which are to be described presently.

Figure 3:
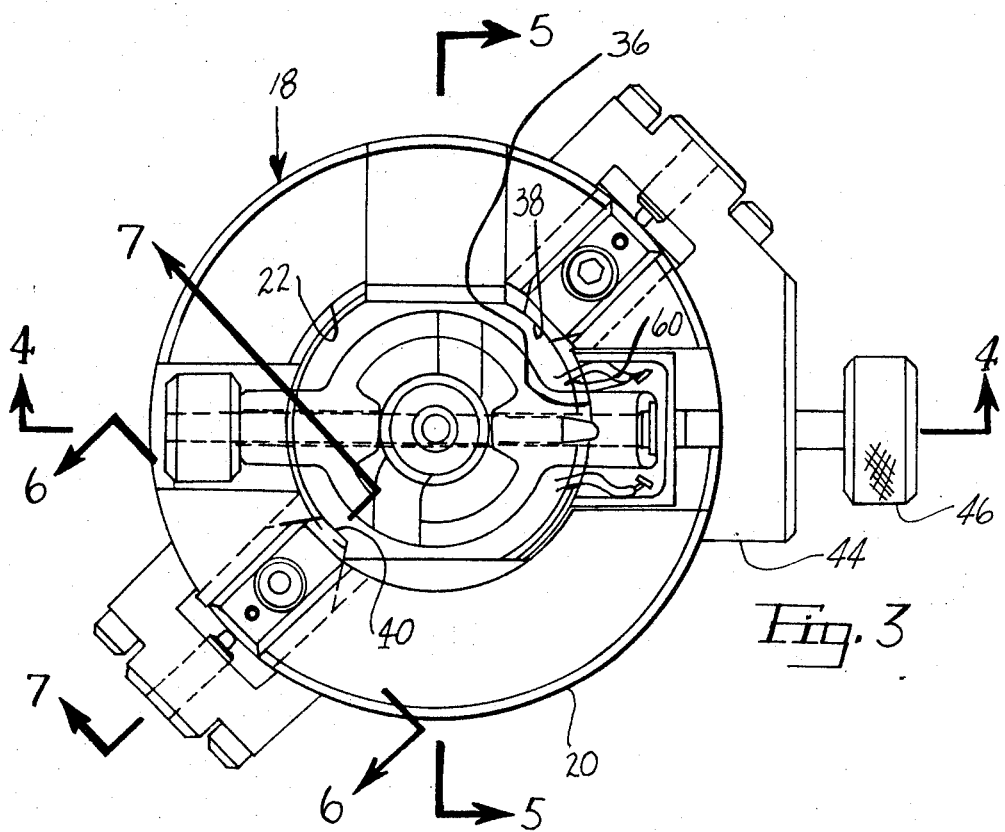
FIG. 3 is a top view of the unique fixture of this invention, showing the motor head and stator of FIG. 1 in the fixture.
Figure 4:
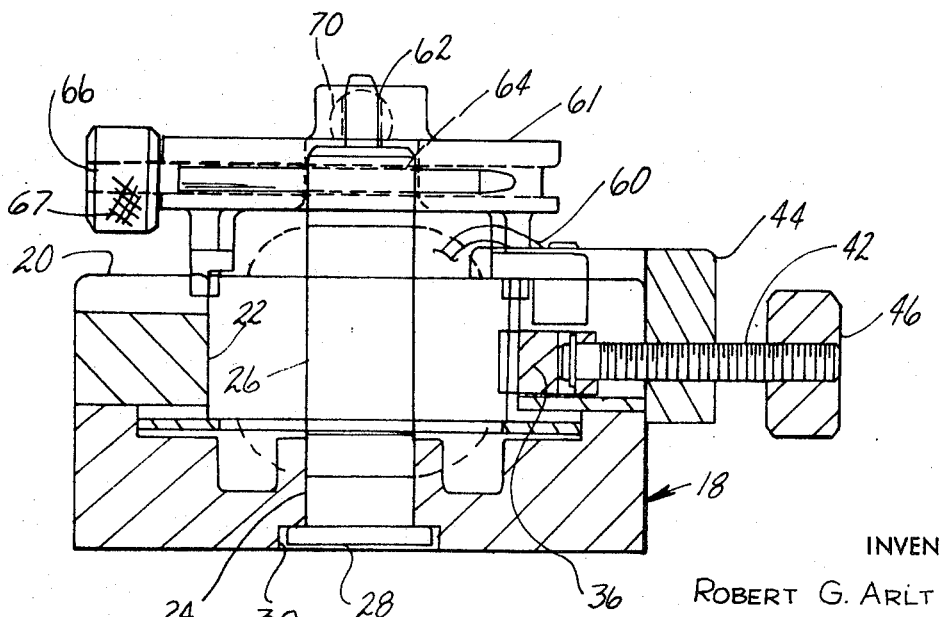
FIG. 4 is a sectional view of the structure shown in FIG. 3 taken along the line 4—4.

The jig or fixture 18 for holding the motor parts in alignment is illustrated in FIGS. 3 and 4. The fixture comprises a body portion 20 having a central recess 22, the sides of which correspond to the mounting surface on which the motor is supported in an appliance, and the bottom provided with a bore 24. Within the bore 24 and extending through the center of the recess 22 there is provided a centralized pin or mandrel 26 having a press fit in bore 24. The annular upper portion of base 18 is provided with a plurality of radially cut recesses to facilitate insertion and removal of the stator and to receive spring biased clamping elements 38, 40, and the manually operated clamp 36 which exerts pressure on the stator 12 when seated in recess 22. The clamp 36 is loosely affixed to lead screw 42 which is in threaded engagement with clamp/block 44, which is secured to the fixture 18. Radial movement, and hence engagement between clamp member 36 and stator 12, is accomplished by turning thumb wheel 46 which is rigidly attached to lead screw 42.

Figure 7:
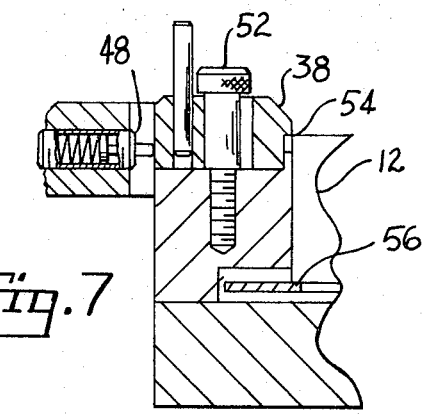
FIGS. 6 and 7 are partial sectional views illustrating details of the structure shown in FIG. 3, taken along the lines 6—6 and 7—7 respectively.
Figure 5:
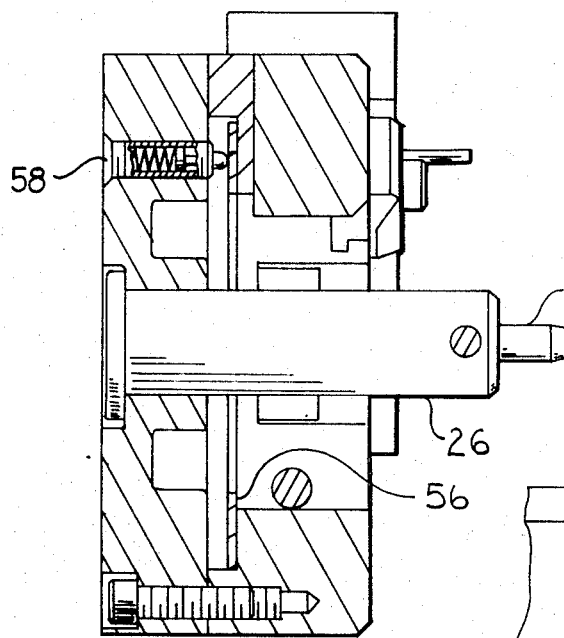
FIG. 5 is a sectional view of the structure shown in FIG. 3 taken along the line 5—5, but excluding the motor sub-assembly.
Figure 6:
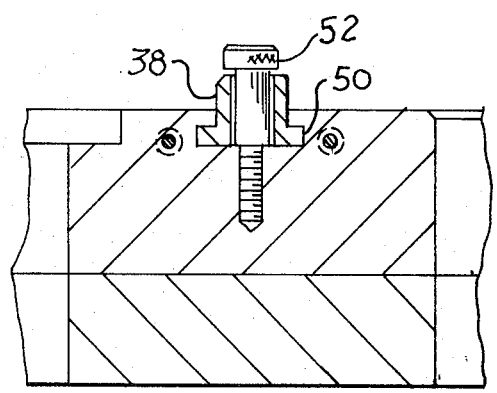

The remaining clamping elements 38 and 40, which are spring biased are identical but disposed approximately 180° from one another. These elements accurately locate the axial or vertical position of the stator 12 in the fixture 18. The clamping element 38 (FIG. 7), which is identical in construction to clamping element 40, is urged radially inward by spring plunger 48 and is retained by the dove tail arrangement 50 as seen in FIG. 6. The radial movement of clamping element 38 is limited by screw 52. The stator assembly 12 is pushed upward against the forward lip 54 of clamping element 38 by means of a spring loaded plate 56, see FIG. 7. An upward spring force is applied to the plate 56 by three circumferentially spaced spring plungers 58 [FIG. 5].

In assembling the motor assembly in the fixture 18 just described, the stator assembly 12 containing the windings and leads 60 is positioned in said fixture over the mandrel 26 in the manner shown in FIGS. 3 and 4. That is, the wound stator is pushed down in the fixture 18 against spring plate 56 until clamping elements 38 and 40 are cleared, permitting them to move inwardly into stator abutting position. The stator is then released and spring plate 56 pushes it up against the forward lip 54. The clamping element 36 is then tightened to hold the stator against surface 22, the latter corresponding to the mounting surface on which the motor is supported in the appliance.

It will be recalled from the discussion above that the mandrel 26 is a press fit in the bore 24 with the head 28 seated in the center recess 30. The mandrel is necessary to provide means for aligning the head assembly 61 relative to the stator assembly 12. Therefore, the opposite end of the mandrel has been provided with a reduced portion 62 to simulate the electric motor shaft. In addition, a transverse opening 64 has been provided to receive a pin assembly 66, which includes the knurled knob 67, the function of which will be made clear by the description to follow.

As a result of the precise positioning achieved by the means described above, it is possible to use a relatively loose fit between the head assembly and the stator when they are mated. This allows for ample machining tolerances or errors in the head assembly. When the components are brought together at their mating surfaces, the adhesive film is such as to fill the space therebetween. More specifically, an adhesive, such as a non-shrinking thermoset type epoxy, is applied at 75 to the mating areas of the head 61 and stator 12 and the head assembly is then positioned over the mandrel and stator. The pin 66 is then inserted through the head assembly and mandrel. Since there is a loose fit between the head assembly and the stator, as described above, the head assembly's concentricity is determined by the snug fit of the bearing on portion 62 of the mandrel. Any inaccuracies in the fit between the head and stator are accomodated by variations in the film of adhesive therebetween, thus eliminating the errors in machining and the close tolerances required prior to this invention.

The head assembly 61 contains among other elements a centrally located self-aligning bearing 70. Said bearing is held firmly in place by a retainer which has the function of holding the bearing in place securely as well as allowing the adjustable motion that is necessarily required by the self-aligning bearing. In the event additional mechanical strength is desired in the assembly of the head and stator, studs 72 may be added to the head. The threaded studs are sized for a loose fit in the holes 68 in the stator 12 so they will not interfere with the centering action of mandrel 26 on the head assembly as it is positioned over the mandrel. When studs 72 are used, adhesive is put into holes 68 as well as on the mating areas 75. After the adhesive is permitted to harden or cure, the stator-head assembly may be removed from the fixture.

The engagement just described is assisted by the tapered lead on the simulated bearing diameter 62. This simulated bearing diameter is of the same diameter as the bearing area of the motor shaft 14 and is located centrally to the wall of recess 22 of the fixture 18. The stud members 72 project down into the holes 68 where they are surrounded by the adhesive. The location of the head assembly 61 along the axis of the mandrel 26 is controlled by the pin assembly 66 which is inserted through the brush holders 65 of head 61 and the opening 64 in said mandrel.

To recapitulate the aligning operation according to the invention, the wound stator is pushed down in the fixture against plate 56 until retainers 38 and 40 are cleared, permitting them to move inwardly into stator abutting position. The stator is then released and spring plate 56 pushes it up against the lips 54. The clamp 36 is then tightened to hold the stator against surface 22. Adhesive is applied to mating areas of the head and stator and the head assembly is then positioned over the mandrel and stator, and pin 66 is inserted through the head assembly and mandrel. Since the head has a loose fit at its mating area with the stator, its concentricity is determined by the snug fit of the bearing on portion 62 of the mandrel. Inaccuracies in the fit between head and stator are accommodated by variations in the film of adhesive.

The adhesive is permitted to harden or cure, after which the stator/head assembly is removed from the fixture.

If additional mechanical strength is desired in the assembly of head and stator, studs 72 may be added to the heads. The threaded studs are sized for a loose fit in the holes 68 so they will not interfere with the centering action of mandrel 26 on the head assembly as it is positioned over the mandrel. When studs 72 are used, adhesive is put into holes 68 as well as the mating areas 75.

Since it may become apparent to those skilled in the art that modifications may be made in this procedure, and the means for accomplishing same, no limitation is intended to be imposed herein except as set forth in the appended claims.

The embodiments of the invention in which an exclusive property or privilege is claimed are defined as follows:

1. A fixture for pre-aligning the stator and rotating shaft of an electric motor having only a single end bearing for said shaft, comprising a base having an annular portion to define a recess therein, said recess being larger than said stator, a bore in the bottom of said recess for receiving a mandrel, a mandrel in said bore, means in said annular portion for exerting pressure in a direction normal to said mandrel, to fix the location, radially, of a stator seated therein, and means at each end of said annular portion for fixing the axial position of a stator received therein, 2. The fixture according to claim 1, wherein said normal pressure means include a screw clamp.

3. The fixture according to claim 1, wherein said mandrel is provided with a reduced portion, the diameter of which substantially equals the shaft diameter of the electric motor to be aligned with said stator.

4. The fixture according to claim 1, wherein one of said means for controlling the axial movement of the stator comprises a spring plate disposed adjacent the bottom of said recess.

5. The fixture according to claim 1, including a pair of spring-biased clamps disposed along and acting within a plane intersecting said mandrel.

* * * * *